(12) United States Patent
Hagano et al.

(10) Patent No.: US 9,102,230 B2
(45) Date of Patent: Aug. 11, 2015

(54) FUEL TANK OPENING AND CLOSING DEVICE

(71) Applicants: TOYODA GOSEI CO., LTD., Kiyosu-shi, Aichi-ken (JP); HONDA MOTOR CO., LTD., Tokyo (JP)

(72) Inventors: Hiroyuki Hagano, Kiyosu (JP); Norihiro Yamada, Kiyosu (JP); Takeaki Nakajima, Wako (JP); Shinichiro Ushigome, Wako (JP); Yoshikazu Kaneyasu, Wako (JP)

(73) Assignees: TOYODA GOSEI CO., LTD., Aichi-pref. (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/387,269

(22) PCT Filed: Mar. 8, 2013

(86) PCT No.: PCT/JP2013/001530
§ 371 (c)(1),
(2) Date: Sep. 23, 2014

(87) PCT Pub. No.: WO2013/145591
PCT Pub. Date: Oct. 3, 2013

(65) Prior Publication Data
US 2015/0048087 A1  Feb. 19, 2015

(30) Foreign Application Priority Data

Mar. 29, 2012 (JP) .................................. 2012-75435
Mar. 29, 2012 (JP) .................................. 2012-75439

(51) Int. Cl.
*B65B 3/00* (2006.01)
*B60K 15/05* (2006.01)
(Continued)

(52) U.S. Cl.
CPC ................ *B60K 15/05* (2013.01); *B60K 15/04* (2013.01); *F16K 1/2028* (2013.01);
(Continued)

(58) Field of Classification Search
CPC ............... B60K 2015/0461; B60K 2015/0429; B60K 2015/0458; B60K 15/04; B60K 15/05; F16K 1/2028; F16K 1/2071; F16K 1/50
USPC ......... 220/86.1, 86.2, 86.3, DIG. 33, DIG. 32
See application file for complete search history.

(56) References Cited

U.S. PATENT DOCUMENTS

2006/0162813 A1  7/2006  Walkowski
2010/0012223 A1  1/2010  Yoshida
(Continued)

FOREIGN PATENT DOCUMENTS

JP     2528517 B2    6/1996
JP     2000-6675 A   1/2000
(Continued)

OTHER PUBLICATIONS

International Search Report of the International Searching Authority mailed Jun. 11, 2013 for the corresponding international application No. PCT/JP2013/001530 (and English translation).

*Primary Examiner* — Robert J Hicks
*Assistant Examiner* — Kareen Rush
(74) *Attorney, Agent, or Firm* — Posz Law Group, PLC

(57) ABSTRACT

A flap valve mechanism in an open-close device for fuel tank includes an open-close member, a shaft support mechanism, a spring and a gasket. The shaft support mechanism includes bearing members and a rotation restricting mechanism. The rotation restricting mechanism includes restricting elements and restricted elements to be engaged with the restricting elements. At a first position, the restricting elements are engaged with the restricted elements, so that the open-close member is moved in a direction of warping the gasket. At a second position, the restricting elements are disengaged from the restricted elements, so that the open-close member is rotated about shaft members.

12 Claims, 12 Drawing Sheets

(51) Int. Cl.
  *B60K 15/04*  (2006.01)
  *F16K 1/20*  (2006.01)
  *F16K 1/50*  (2006.01)

(52) U.S. Cl.
  CPC ................ *F16K 1/2071* (2013.01); *F16K 1/50* (2013.01); *B60K 2015/0429* (2013.01); *B60K 2015/0458* (2013.01); *B60K 2015/0461* (2013.01)

(56) References Cited

U.S. PATENT DOCUMENTS

| | | |
|---|---|---|
| 2010/0126625 A1 | 5/2010 | Berghorst et al. |
| 2010/0218849 A1* | 9/2010 | Hagano .................. 141/350 |
| 2011/0079322 A1 | 4/2011 | Beier et al. |
| 2011/0240640 A1* | 10/2011 | Hagano .................. 220/86.2 |
| 2012/0217240 A1 | 8/2012 | Dutzi et al. |
| 2013/0193140 A1* | 8/2013 | Hagano et al. ............ 220/86.2 |

FOREIGN PATENT DOCUMENTS

| | | |
|---|---|---|
| JP | 2010-23881 A | 2/2010 |
| JP | 2010-522665 A | 7/2010 |
| JP | 4849345 B2 | 10/2011 |
| WO | 2011/053563 A1 | 5/2011 |

\* cited by examiner

FUEL TANK OPENING AND CLOSING DEVICE

CROSS REFERENCE TO RELATED APPLICATIONS

This application is a U.S. national stage application of PCT/JP2013/001530 filed on Mar. 8, 2013, and is based on Japanese Patent Application No. 2012-75435 filed on Mar. 29, 2012 and Japanese Patent Application No. 2012-75439 filed on Mar. 29, 2012, the contents of which are incorporated herein by reference.

TECHNICAL FIELD

The present invention relates to an open-close device for fuel tank that utilizes the moving force of a refueling nozzle to open a flap valve and supply a fuel into a fuel tank.

BACKGROUND

The technique disclosed in Patent Literature 1 has been known with regard to this type of open-close device for fuel tank. The open-close device for fuel tank includes: a tank opening-forming member configured to form a fuel passage to supply a fuel to a fuel tank; a flap valve configured to open and close a filler port provided in the tank opening-forming member; and a gasket configured to seal between the filler port and the flap valve. The tank opening-forming member has a valve support member configured to form the filler port. The flap valve is supported on the valve support member in a rotatable manner by a shaft support mechanism. In the open-close device for fuel tank, in the process of a fuel supply, the flap valve is pressed by an edge of a refueling nozzle to be rotated via the shaft support mechanism, and the refueling nozzle is inserted through the filler port. In this state, the fuel discharged from the refueling nozzle is supplied through the fuel passage to a fuel tank.

In the open-close device for fuel tank, the gasket is generally designed to exert the highest sealing power when the gasket is bent under application of a force in a direction perpendicular to a plane flush with the gasket (warping direction) from the flap valve. The gasket is, however, likely to receive a force in an axial direction (lateral direction) which is substantially perpendicular to the warping direction, when the flap valve is rotated about a shaft. When receiving a force in the lateral direction from the flap valve, the gasket is deflected in its circumferential direction. This makes it difficult to ensure the high sealing property between the gasket and the flap valve.

PATENT LITERATURE

PTL 1; WO 2011-53563

SUMMARY

In order to solve the problems of the prior art described above, an object of the invention is to provide an open-close device for fuel tank configured to open and close a filler port by rotating a flap valve about a shaft and to seal between the flap valve and the opening periphery of the filler port with a gasket and enabled to ensure high sealing property by the simple structure.

In order to achieve at least part of the above object, the present invention may be implemented by the following aspects.

(1) According to one aspect, there is provided an open-close device for fuel tank configured to open and close a fuel passage for supplying a fuel discharged from a refueling nozzle to a fuel tank. The open-close device comprises: a tubular body having a tube main body configured to form the fuel passage; a valve support member having: a valve support main body in a cylindrical shape to be inserted into the tube main body; and a filler port configured to define part of the fuel passage; and a flap valve mechanism having; an open-close member pressed by an edge of the refueling nozzle to open the filler port; a shaft support mechanism provided on the open-close member and the valve support member to support the open-close member in a rotatable manner; a spring arranged to press the open-close member in a closing direction; and a gasket configured to seal between an opening periphery of the filler port and the open-close member. The shaft support mechanism comprises: a shaft member formed on one end of the open-close member; a bearing member having a shaft support hole, in which the shaft member is supported in a rotatable manner relative to the valve support member; and a rotation restricting mechanism configured to restrict rotation of the shaft member supported in the shaft support hole. The bearing member is configured to support the shaft member to be movable in the shaft support hole between a first position where the open-close member warps the gasket and a second position where the open-close member does not warp the gasket. The rotation restricting mechanism comprises: a restricting element provided on the opening periphery of the filler port; and a restricted element provided on the shaft member to be engaged with the restricting element. At the first position, the restricting element is engaged with the restricted element to restrict rotation of the shaft member, so that the open-close member is moved in a direction of warping the gasket, while maintaining an attitude substantially parallel to a plane where the gasket is placed. At the second position, the restricting element is disengaged from the restricted element, so that the open-close member is rotatable about the shaft member.

(2) In the open-close device for fuel tank according to this aspect, the open-close member is opened and closed with receiving the force of the spring, when the open-close member is pressed by the edge of the refueling nozzle or when the pressing force applied to the open-close member is released. In the shaft support mechanism, at the first position, the restricting element of the rotation restricting mechanism is engaged with the restricted element to restrict rotation of the shaft member, so that the open-close member is moved in the direction of warping the gasket, while maintaining the attitude parallel to the plane where the gasket is placed. At the second position, the restricting element is disengaged from the restricted element, so that the open-close member is rotated about the shaft member. Accordingly, in the process that the open-close member opens and closes the filler port, at the first position where the open-close member warps the gasket, the open-close member is moved in the direction of warping the gasket to uniformly warp the entire circumference of the gasket, while maintaining its attitude parallel to the plane on which the gasket is placed. This structure ensures the high sealing property.

(3) According to another aspect, there is provided the open-close device for fuel tank, wherein the shaft support hole is formed as a slot that allows the shaft member to move between the first position and the second position. According to another aspect, there is provided the open-close device for fuel tank, wherein the shaft body is pressed by the spring from the second position toward the first position.

(4) According to another aspect, there is provided the open-close device for fuel tank, wherein the restricting element is provided as a projection protruded from the opening periphery of the filler port, and the restricted element is provided as a cutout formed on an outer circumference of the shaft member to be engaged with the restricting element.

(5) According to another aspect, there is provided the open-close device for fuel tank, further comprising a coupling mechanism having a first coupling part and a second coupling part to couple the tubular body with the valve support member. The first coupling part comprises: a first pipe-side engagement structure protruded from an inner wall of the tube main body toward center of the tube main body; and an inner coupling structure formed on outer wall of the valve support member to be engaged with the first pipe-side engagement structure. The second coupling part comprises: a second pipe-side engagement structure protruded from an outer wall of the tube main body in a direction away from the center of the tube main body; and an outer coupling structure formed on an opening end of the valve support member to be engaged with the second pipe-side engagement structure. The outer coupling structure is formed by folding along the opening end of the tube main body and the outer wall of the tube main body to be engaged with the second pipe-side engagement structure.

In the open-close device for fuel tank according to this aspect, the valve support member is coupled with the tubular body via the coupling mechanism by inserting the valve support member into the tubular body. More specifically, the coupling mechanism includes the first coupling part and the second coupling part and uses these two coupling parts to couple the valve support member with the tubular body. The coupling position of the first coupling part is inside the tubular body, while the coupling position of the second coupling part is outside the tubular body. Accordingly, the coupling position of the first coupling part inside the tubular body is protected from an external force by the tubular body as the barrier. Even when receiving a large external force caused by, for example, a collision of the vehicle, the valve support member is unlikely to be uncoupled from the tubular body, so that the open-close device for fuel tank ensures the high sealing property against the fuel tank. The coupling position of the second coupling part is outside the tubular body and is visible from outside of the tubular body. The coupling state of the second coupling part can thus be checked in the course of attachment of the valve support member to the tubular body. The incomplete coupling state is thus avoidable.

(6) According to another aspect, there is provided the open-close device for fuel tank, wherein the inner coupling structure comprises an engagement piece formed to be cantilevered and a claw provided on an end of the engagement piece, wherein the claw is configured to be engaged with the first pipe-side engagement structure, and the outer coupling structure comprises an engagement piece formed to be cantilevered and a claw provided on one end of the engagement piece, wherein the claw is configured to be engaged with the second pipe-side engagement structure.

(7) According to another aspect, there is provided the open-close device for fuel tank, wherein in a process of attachment of the tubular body to the valve support member by moving the tubular body in an axial direction of the tubular body, the second coupling part is configured such that coupling of the claw of the outer coupling structure with the second pipe-side engagement structure is completed after completion of coupling of the first coupling part. There is accordingly only a need to check for the coupling state of the second coupling part, since it is assumed that coupling of the first coupling part has already been completed at this timing. This further facilitates the operation of attachment of the valve support member to the tubular body.

BRIEF DESCRIPTION OF DRAWINGS

DESCRIPTION OF EMBODIMENTS (1) General Structure of Open-close Device for Fuel Tank FIG. 1 is a perspective view illustrating an open-close device 10 for fuel tank according to a first embodiment of the invention. A fuel lid FL for fuel supply is held in an openable and closable manner on a rear portion of an automobile body. The fuel lid FL has a lid main body FLa along the outer panel of the body supported in an openable and closable manner on the outer panel of the body via a hinge FLb. The space accessible by opening the fuel lid FL serves as a fuel filler chamber FR. The open-close device 10 for fuel tank mounted on a base plate BP is located in this fuel filler chamber FR. The open-close device 10 for fuel tank is a mechanism configured to supply the fuel to a fuel tank without using a fuel cap or more specifically a mechanism configured to open and close a valve placed in a fuel passage with an external force from a refueling nozzle after opening the fuel lid FL and thereby enabling the refueling nozzle to supply the fuel to the fuel tank. The following describes the detailed structure of the open-close device for fuel tank.

(2) Structures and Operations of Respective Components

Figure 1:
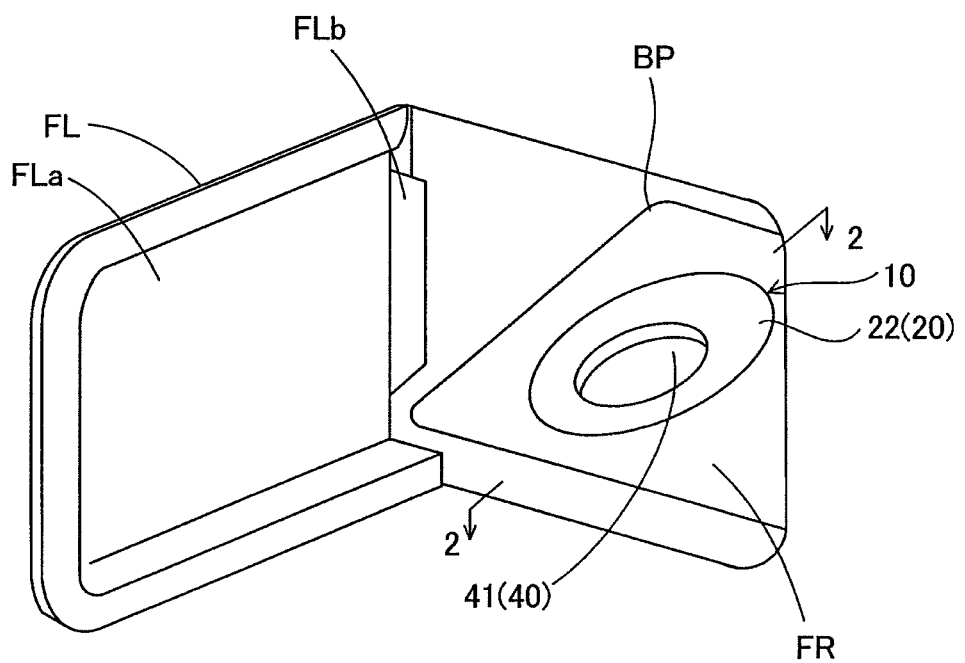
FIG. 1 is a perspective view illustrating an open-close device for fuel tank according to one embodiment of the invention.
Figure 2:
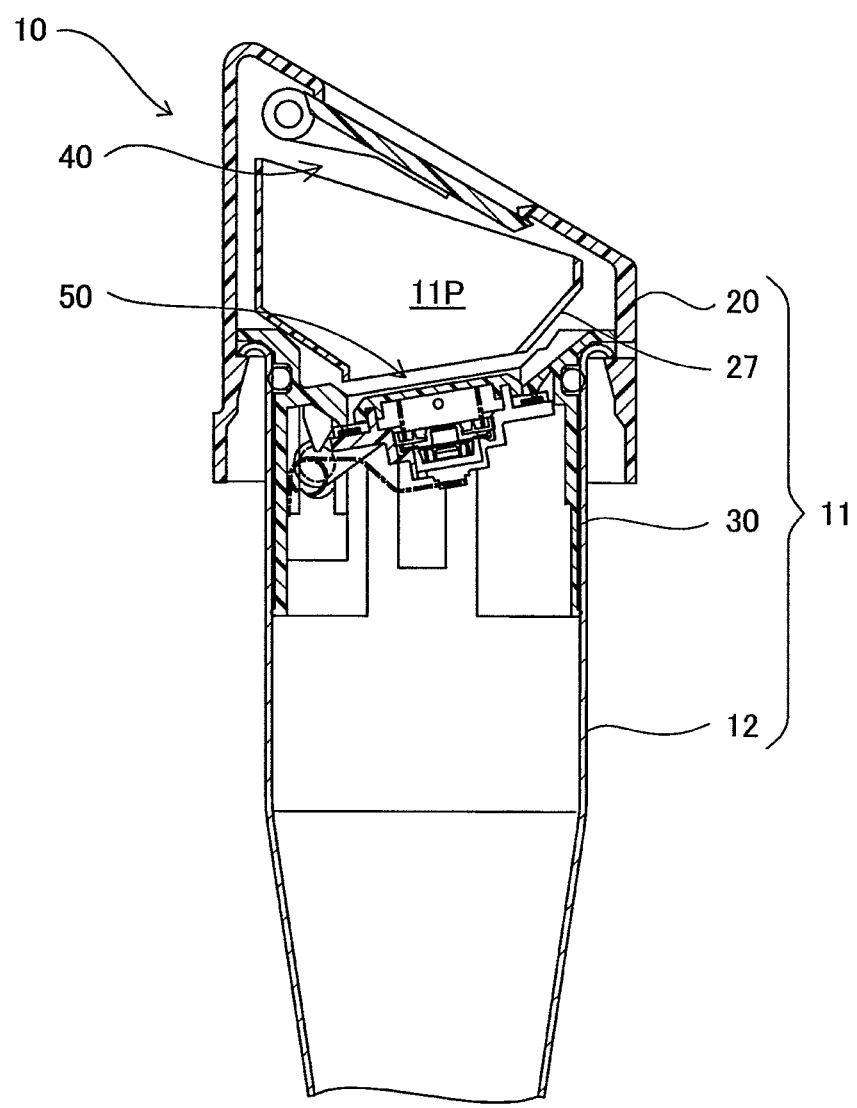
FIG. 2 is a cross sectional view taken on a line 2-2 in FIG. 1.
Figure 3:
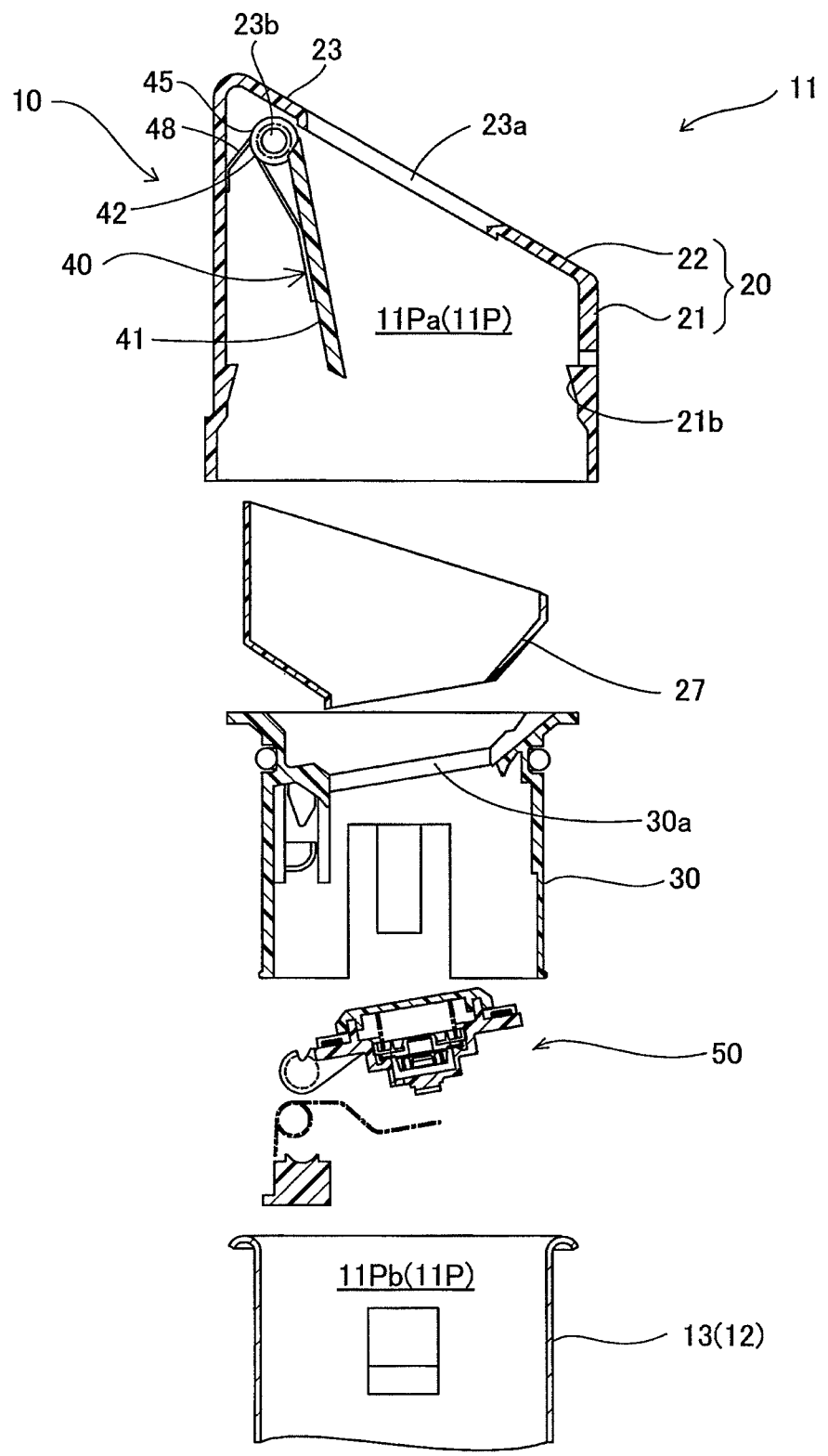
FIG. 3 is an exploded cross sectional view of the open-close device for fuel tank in FIG. 2.

FIG. 2 is a cross sectional view taken on a line 2-2 in FIG. 1. FIG. 3 is an exploded cross sectional view of the open-close device 10 for fuel tank of FIG. 2. The open-close device 10 for fuel tank has a tank opening-forming member 11 configured to define a fuel passage 11P that is connected to a fuel tank (not shown), a shutter mechanism 40 and a flap valve mechanism 50.

(2)-1. Tank Opening-forming Member 11

With referring to FIG. 3, the tank opening-forming member 11 is a member defining the fuel passage 11P and includes a tubular body 12 connected to the fuel tank, a cover member 20 attached to an upper portion of the tubular body 12, an insertion guide member 27 placed in the cover member 20, and a valve support member 30 mounted on the upper portion of the tubular body 12.

The tubular body 12 is a provided as a pipe made of a metal and includes a tube main body 13 connected to the fuel tank. The cover member 20 is attached to an upper portion of the valve support member 30 and includes a cylindrical side wall section 21 and a cover upper plate 22. The side wall section 21 is in a cylindrical shape having a sloped upper portion, and the cover upper plate 22 is integrally formed with the sloped upper portion. The cover upper plate 22 has an opening structure 23, which the refueling nozzle is inserted in. The opening structure 23 has an insertion opening 23a and a shaft support 23b. The insertion opening 23a is formed in a substantially circular shape for insertion of the refueling nozzle and is configured to define part of the fuel passage 11P and to be narrower than the passage area of the fuel passage 11P. The shaft support 23b is formed on one end of the insertion opening 23a and is provided as a location which an end of the shutter mechanism 40 is attached to and supported on. The cover member 20 is mounted on the upper portion of the valve support member 30 by engagement between an engagement claw 21b provided on a lower portion of the side wall section 21 and an engagement structure provided on an upper portion of the valve support member 30.

The insertion guide member 27 is placed in the cover member 20 and is provided as a member serving to guide the refueling nozzle inserted into the fuel passage 11P and connect the insertion opening 23a of the cover upper plate 22 with a filler port 30a of the valve support member 30. The insertion guide member 27 is formed in a conical shape sloped to narrow the passage area toward the filler port 30a of the valve support member 30, so as to promptly flow the fuel entering an insertion passage 11Pa toward the filler port 30a.

Figure 4:
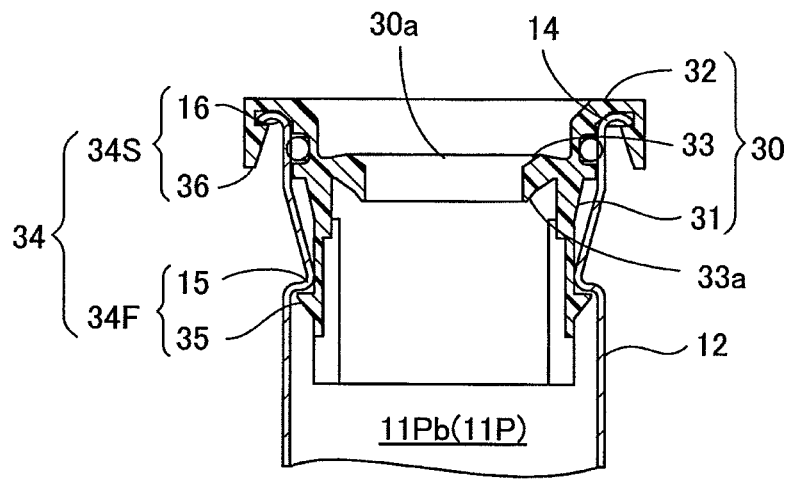
FIG. 4 is a diagram illustrating a state of assembly of a tubular body with a valve support member.
Figure 5:
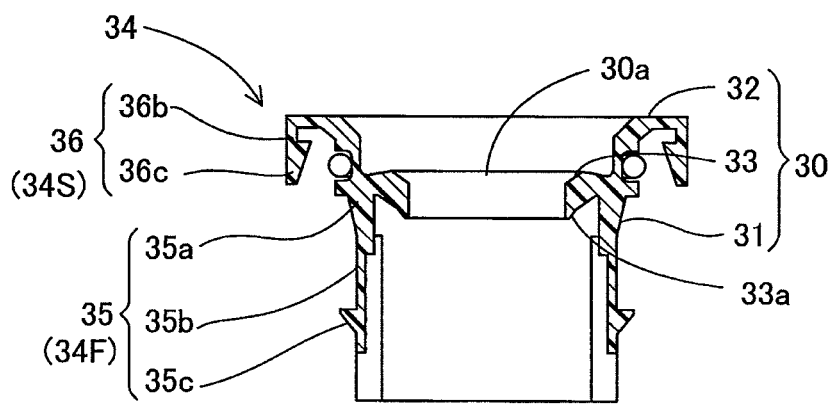
FIG. 5 is a cross sectional view illustrating a state prior to assembly of the tubular body with the valve support member.
Figure 5:
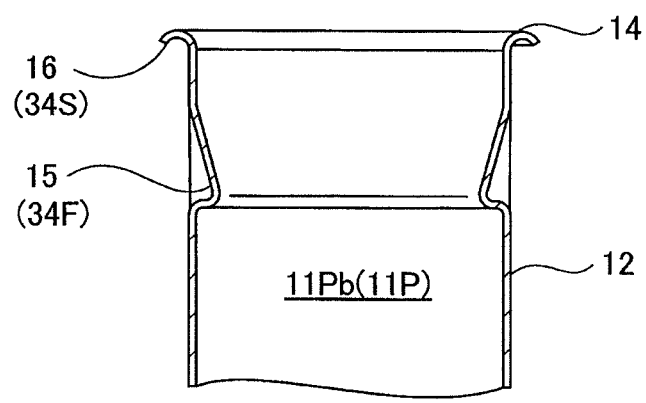
Figure 6:
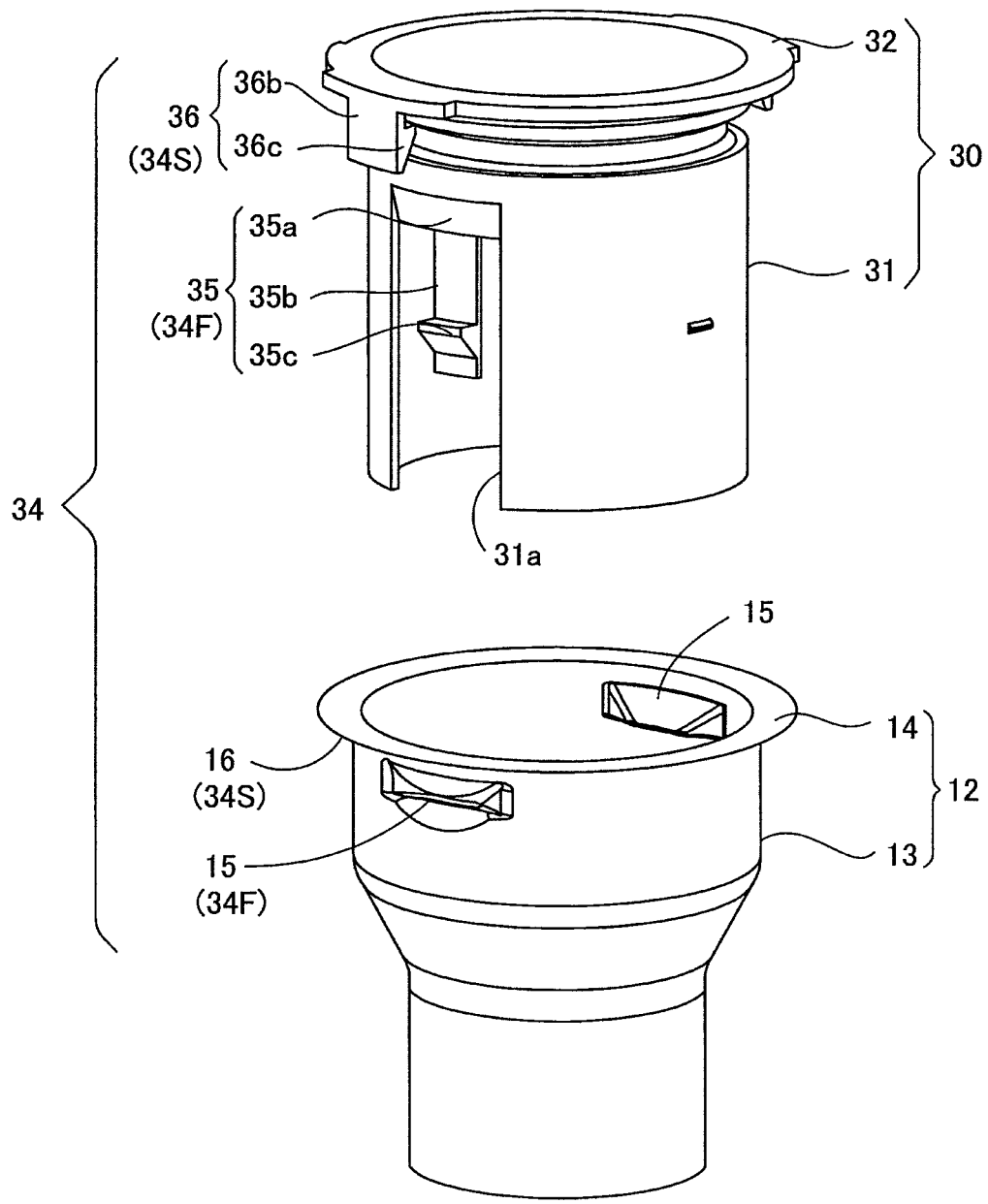
FIG. 6 is a perspective view illustrating the state prior to assembly of the tubular body with the valve support member.

FIG. 4 is a diagram illustrating a state of assembly of the tubular body 12 with the valve support member 30. FIG. 5 is a cross sectional view illustrating a state prior to assembly of the tubular body 12 with the valve support member 30. FIG. 6 is a perspective view illustrating the state prior to assembly of the tubular body 12 with the valve support member 30.

The valve support member 30 is mounted on the upper portion of the tubular body 12. Attachment of the flap valve mechanism 50 (FIG. 3) to the valve support member 30 serves to divide the fuel passage 11P into the insertion passage 11Pa (FIG. 2) and a tank-side passage 11Pb that is a passage on the fuel tank side. The valve support member 30 includes a valve support main body 31 in a cylindrical shape, a flange 32, and a filler port-forming member 33 configured to define the filler port 30a. These components are formed integrally.

The valve support main body 31 is formed in a cylindrical shape to be inserted in the tubular body 12 and has an inner space that defines part of the fuel passage 11P. The flange 32 is formed to be protruded outward from an upper end of the valve support main body 31 and is in contact with a flange 14 of the tubular body 12. The filler port-forming member 33 is formed to be inclined relative to a plane perpendicular to the axial direction and to define the filler port 30a. A seat section 33a is formed on the lower face side of the opening periphery of the filler port 30a, i.e., on the opening periphery of the fuel tank side.

FIG. 6 is the perspective view illustrating the state prior to assembly of the tubular body 12 with the valve support member 30 via a coupling mechanism 34. The coupling mechanism 34 is provided as a mechanism serving to attach the valve support member 30 to the tubular body 12 and includes a first coupling part 34F and a second coupling part 34S.

The first coupling part 34F includes first pipe-side engagement structures 15 of the tubular body 12 and inner coupling structures 35 of the valve support member 30. The first pipe-side engagement structures 15 are formed by recessing parts of the tubular body 12 toward its center and along the circumferential direction. The two first pipe-side engagement structures 15 are formed in a predefined width and are arranged at two different positions of 180 degrees away from each other about the axis of the tube main body 13 of the tubular body 12. The inner coupling structures 35 are members respectively provided to engage with the first pipe-side engagement structures 15. The inner coupling structure 35 includes an engagement piece 35b formed downward to be cantilevered from a base section 35a, and a claw 35c formed on a lower portion of the engagement piece 35b to be protruded radially outward. The inner coupling structure 35 is formed such that the claw 35c of the engagement piece 35b is engaged with the first pipe-side engagement structure 15 in the course of attachment of the valve support member 30 to the tubular body 12, so as to prevent the valve support member 30 from being slipped off from the tubular body 12. A specific part of the valve support main body 31, which the inner coupling structure 35 faces, has an opening 31a formed by cutting out the valve support member 31 upward from its lower end. This structure facilitates mold splitting in the process of injection molding.

The second coupling part 34S includes a second pipe-side engagement structure 16 formed on the flange 14 and outer coupling structures 36 formed on the valve support member 30. The second pipe-side engagement structure 16 is formed in a lower face of the flange 14 on the upper portion of the tubular body 12. Each of the outer coupling structures 36 is a member to be engaged with the second pipe-side engagement structure 16 and includes: an engagement piece 36b formed to be cantilevered downward from a lower end of the flange 32 of the valve support member 30 and a claw 36c formed on a lower portion of the engagement piece 36b to be protruded radially inward. The outer coupling structure 36 is formed such that the claw 36c of the engagement piece 36b is engaged with the second pipe-side engagement structure 16 of the flange 14 in the course of attachment of the valve support member 30 to the tubular body 12, so as to prevent the valve support member 30 from being slipped off from the tubular body 12.

The first pipe-side engagement structures 15 and the second pipe-side engagement structure 16 of the flange 14 included in the coupling mechanism 34 may be formed by a metal processing technique such as press forming or swaging.

By using the structure of the coupling mechanism 34 described above, the valve support member 30 is attached to the tubular body 12 by the following procedure as shown in FIGS. 4 and 5. The lower portion of the valve support main bod 31 of valve support member 30 is inserted into the opening of the tubular body 12. The claws 35c of the inner coupling structures 35 come into contact with the first pipe-side engagement structures 15 of the tubular body 12. The engagement pieces 35b are then bent radially inward, and the claws 35c ride over the first pipe-side engagement structures 15 to be engaged with the first pipe-side engagement structures 15. The claws 36c of the outer coupling structures 36 come into contact with the flange 14 of the tubular body 12. The engagement pieces 36b are then bent radially outward, and the claws 36c ride over the flange 14 to be engaged with the second pipe-side engagement structure 16.

(2)-2 Shutter Mechanism 40

Referring to FIG. 3, the shutter mechanism 40 is provided as a mechanism to open and close the insertion opening 23a along with insertion of the refueling nozzle and is fixed to the cover member 20. The shutter mechanism 40 includes a shutter member 41, a bearing 45 configured to support a shaft 42 of the shutter member 41 and fixed to the cover member 20, and a spring 48 configured to press the shutter member 41 in a closing direction. According to this structure of the shutter mechanism 40, when being pressed by an edge of the refueling nozzle FN, the shutter member 41 is rotated about the shaft 42 supported on the bearing 45 against the pressing force of the spring 48 to open the insertion opening 23a. When the refueling nozzle FN is pulled out, the insertion opening 23a is closed by the pressing force of the spring 48.

(2)-3 Flap Valve Mechanism 50

Figure 7:
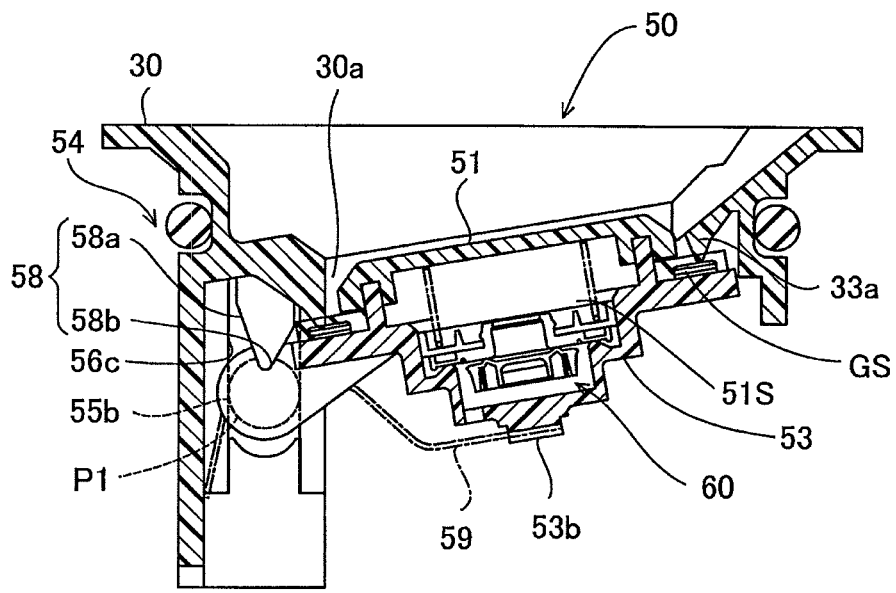
FIG. 7 is a cross sectional view illustrating a flap valve mechanism.

FIG. 7 is a cross sectional view illustrating the flap valve mechanism 50. The flap valve mechanism 50 is provided as a mechanism to open and close the filler port 30a formed in the valve support member 30 and includes: an open-close member 51 configured to open and close the filler port 30a; a shaft support mechanism 54 provided on the open-close member 51 and a valve support member 30 to support the open-close member 51 in a rotatable manner; a spring 59 configured to press the open-close member 51 in a closing direction; a gasket GS compressed in a warping direction (direction of insertion of the refueling nozzle) to seal between the seat section 33a on the opening periphery of the filler port 30a and the open-close member 51; and a pressure regulator 60.

Figure 8:
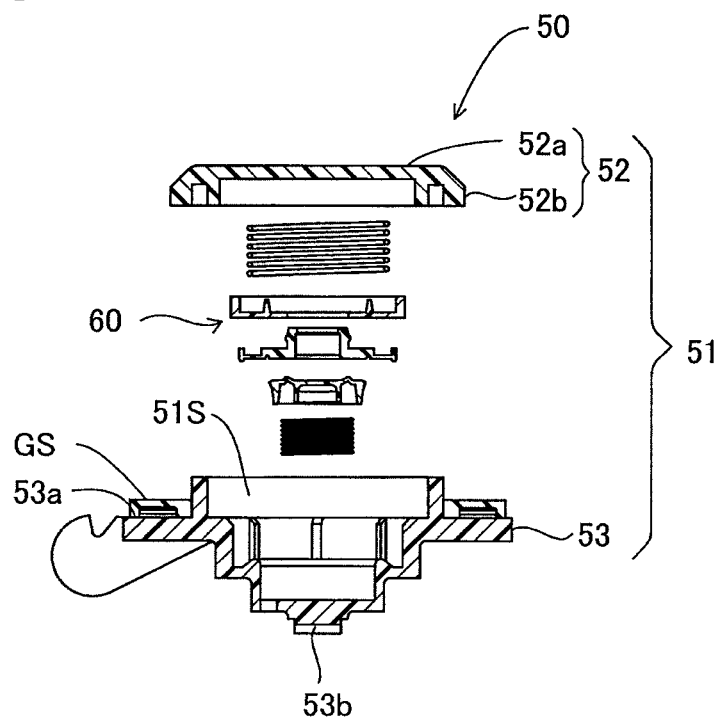
FIG. 8 is an exploded cross sectional view of the flap valve mechanism.
Figure 9:
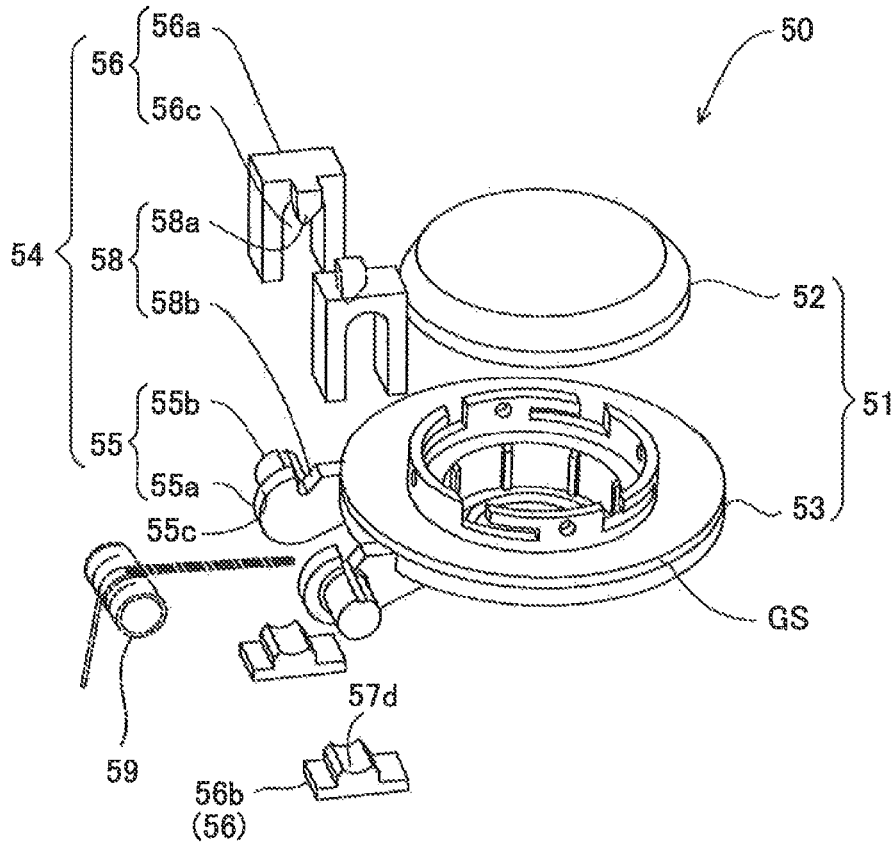
FIG. 9 is an exploded perspective view illustrating the periphery of the flap valve mechanism.

FIG. 8 is an exploded cross sectional view of the flap valve mechanism 50. FIG. 9 is an exploded perspective view illustrating the periphery of the flap valve mechanism 50. The open-close member 51 includes a pressure member 52 and a valve chest-defining member 53. The pressure member 52 has an upper surface 52a pressed by the refueling nozzle and a side wall 52b protruded from the outer periphery of the upper surface 52a and is formed in a upturned dish shape. The valve chest-defining member 53 is formed in a cup-like shape and is joined with the pressure member 52 to define a valve chest 51S which the pressure regulator 60 is placed in. A flange 53a is formed along the outer circumference of the valve chest-defining member 53. The gasket GS is made of a rubber material and is placed and held between an inner circumferential portion on the upper surface of the flange 53a and an outer circumferential portion of the opening periphery of the pressure member 52. As shown in FIG. 7, the gasket GS is compressed against the seat section 33a of the valve support member 30 to seal the filler port 30a.

Referring to FIG. 9, the shaft support mechanism 54 includes shaft members 55 formed on one end of the open-close member 51, bearing members 56 configured to support the shaft members 55 in a rotatable manner relative to the valve support member 30 (FIG. 7), and a rotation restricting mechanism 58 to restrict the rotation of the shaft members 55 supported by the bearing members 56.

The shaft members 55 include a pair of shaft supports 55a and a pair of shaft bodies 55b. The pair of shaft supports 55a are protruded from an end of the valve chest-defining member 53 to be parallel to each other across a space formed between the shaft supports 55a. The shaft bodies 55b are protruded outward from the respective shaft supports 55a. Each of the bearing members 56 is provided as a mechanism to support the shaft member 55 in a rotatable manner and includes an upper shaft support body 56a and a lower support body 56b. The upper shaft support body 56a is protruded from a lower surface of the opening periphery of the filler port-forming member 33 of the valve support member 30 and has a shaft support hole 56c that is open downward. The shaft support hole 56c is formed as a slot to enable the shaft body 55b of the shaft member 55 to move in the direction of insertion (vertical direction). The open-close member 51 is supported in a rotatable manner by supporting the shaft bodies 55b of the shaft members 55 in the shaft support holes 56c. The lower support bodies 56b are attached to the inner wall of the valve support member 30 via an engagement mechanism (not shown). A bearing projection 57d is formed on the lower support body 56b. The bearing projection 57d is inserted into the shaft support hole 56c to support the lower surface of the shaft body 55b.

The rotation restricting mechanism 58 includes restricting elements 58a and restricted elements 58b. The restricting elements 58a are wedge-like elements protruded downward in a triangular shape from a lower surface of the filler port-forming member 33 and are arranged to respectively face the inside of the pair of upper shaft support bodies 56a. The restricted elements 58b are formed by cutting out parts of the outer peripheries of the respective shaft supports 55a in a triangular shape. Insertion of the restricting elements 58a into the restricted elements 58b restricts the rotation of the open-close member 51. The shaft body 55b has an outer periphery in a substantially circular shape. A cutout that is continuous with the restricted element 58b is formed in a part of the outer periphery, such that the tip of the restricting element 58a is inserted in the cutout.

Figure 10:
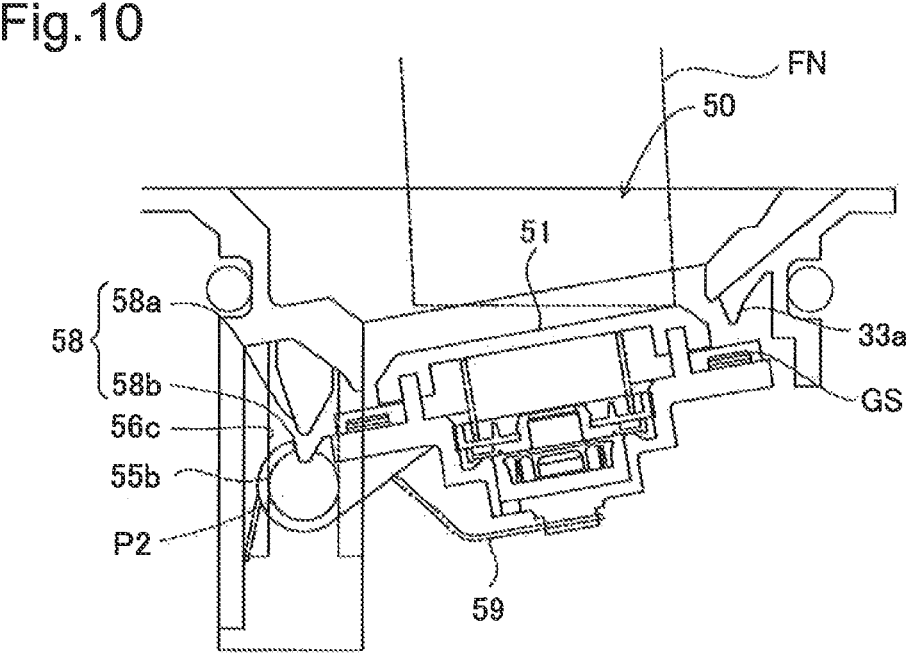
FIG. 10 is a diagram illustrating an open-close operation of the flap valve mechanism.
Figure 11:
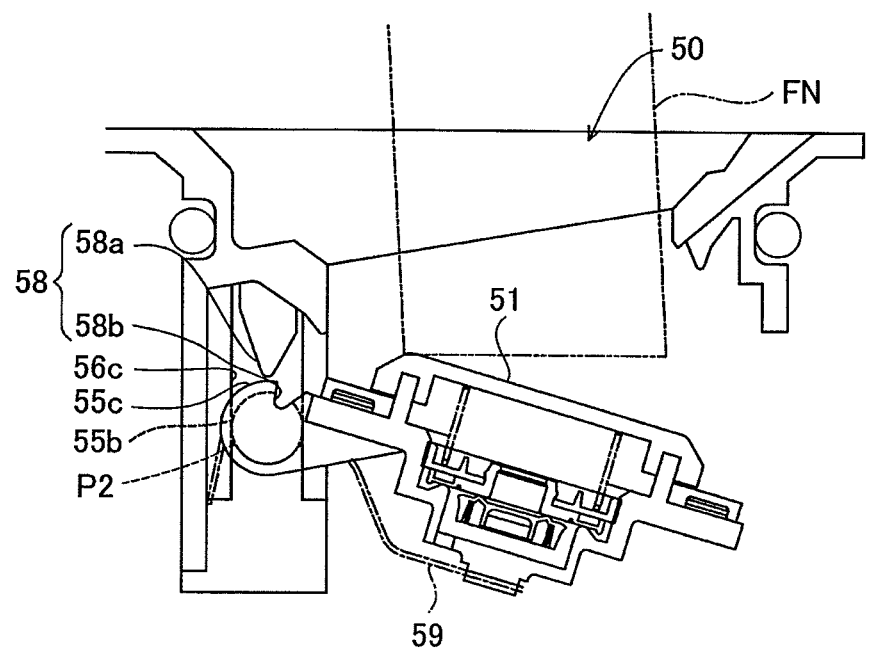
FIG. 11 is a diagram illustrating the open-close operation of the flap valve mechanism.

The spring 59 is a coil spring and has one end of the coil supported on the inner wall of the valve support member 30 (FIG. 7) and the other end supported on the bottom of the open-close member 51. The coiled part of the spring 59 is located between the shaft supports 55a of the shaft members 55 to press the open-close member 51 in a closing direction. As shown in FIG. 7, the other end of the spring 59 is supported on a spring support end 53b on the center of a lower surface of the valve chest-defining member 53. The spring support end 53b supports the other end of the spring 59 to allow for a sliding motion thereof. This structure causes the move of the open-close member 51 to be not restricted by the spring 59 when the open-close member 51 is rotated about the shaft members 55 as the axial center FIGS. 10 and 11 are diagrams illustrating an open-close operation of the flap valve mechanism 50. The open-close member 51 receives a force in the direction of insertion against the force of the spring 59 in the closed state of the open-close member 51 shown in FIG. 7. In this closed state, the pressing force of the spring 59 reaches the shaft bodies 55b across the open-close member 51. The shaft bodies 55b are accordingly located at a first position P1 which is an upper position in the shaft support holes 56c. At the first position P1, the shaft bodies 55b are located in upper regions of the slots of the shaft support holes 56c and are thus enabled to move in the direction of insertion (downward). The restricting elements 58a of the rotation restricting mechanism 58 are engaged with the restricted elements 58b, so that the rotation about the shaft bodies 55b is restricted.

When an edge of a refueling nozzle FN presses the open-close member 51 as shown in FIG. 10, the open-close member 51 receives a force in the direction of insertion against the force of the spring 59. In the state prior to such pressing, the pressing force of the spring 59 reaches the shaft bodies 55b across the open-close member 51, so that the shaft bodies 55b are located at the first position P1 which is the upper position in the shaft support holes 56c. The open-close member 51 receiving the downward force from the refueling nozzle FN moves together with the shaft bodies 55b downward in the shaft support holes 56c. This motion disengages the restricting elements 58a from the restricted elements 58b and causes the shaft bodies 55b to move to a second position P2 which is a lower end position in the shaft support holes 56c. At the second position P2, the open-close member 51 receives the pressing force by the refueling nozzle FN and rotates about the shaft bodies 55b as shown in FIG. 11. With respect to the relationship between the open-close member 51 and the gasket GS, the open-close member 51 warps the gasket GS at the first position P1, whereas the open-close member 51 does not warp the gasket GS at the second position P2.

(3) Open-close Operation of Open-close Device 10 for Fuel Tank

The following describes refueling operation with regard to the open-close device 10 for fuel tank using the refueling nozzle FN.

(3)-1. Opening Operation

Figure 12:
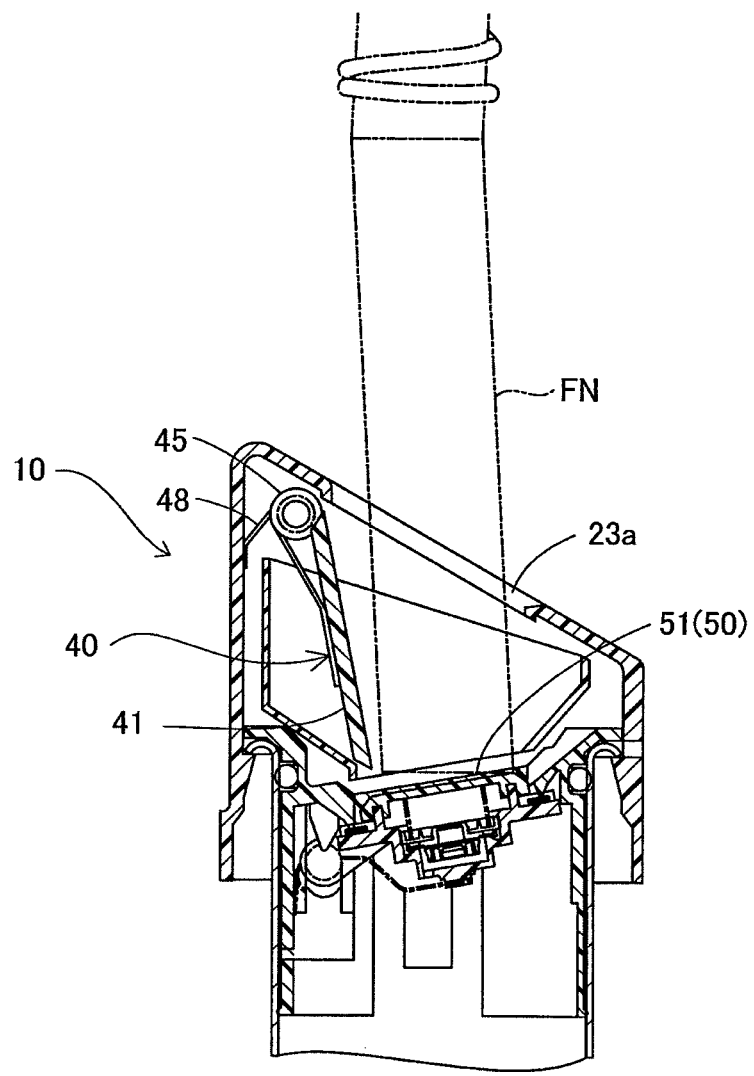
FIG. 12 is a diagram illustrating a refueling operation of the open-close device for fuel tank.
Figure 13:
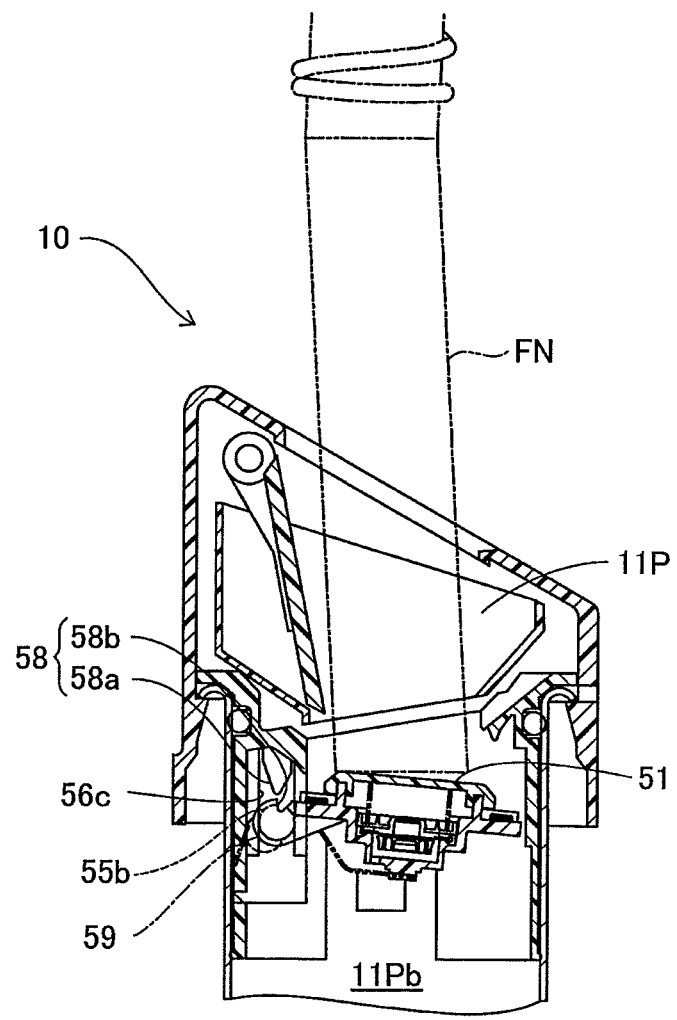
FIG. 13 is a diagram illustrating an operation subsequent to FIG. 12.

Opening the fuel lid FL causes the open-close device 10 for fuel tank placed in the fuel filler chamber FR to be accessible as shown in FIG. 1. Referring to FIG. 12, when the refueling nozzle FN is inserted through the insertion opening 23a and the edge of the refueling nozzle FN presses the shutter member 41, the shutter member 41 rotates about the bearing 45 against the pressing force of the spring 48, so as to cause the refueling nozzle FN to be further inserted until reaching the open-close member 51 of the flap valve mechanism 50. When the edge of the refueling nozzle FN presses the open-close member 51, the state shifts from the state of FIG. 7 to the state of FIG. 10. More specifically, the open-close member 51 moves from the first position P1 to the second position P2 against the pressing force of the spring 59, while the gasket GS is away from the seat section 33a with maintaining its attitude parallel to the plane where the gasket GS is placed. The open-close member 51 receiving the pressing force from the refueling nozzle FN at the second position P2 rotates about the shaft bodies 55b as shown in FIG. 11. This causes the refueling nozzle FN to be inserted into the tank-side passage 11Pb as shown in FIG. 13.

Figure 14:
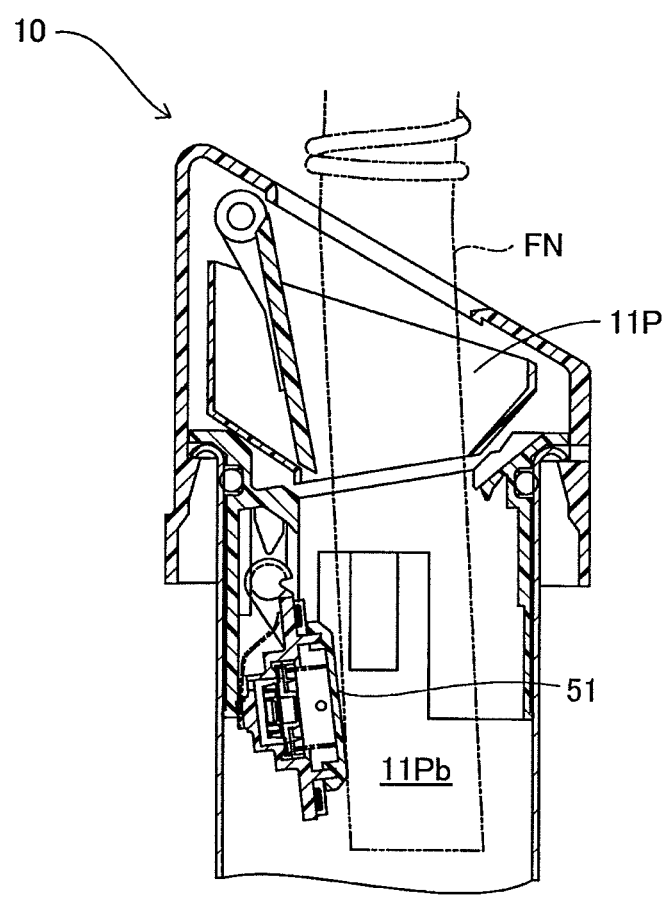
FIG. 14 is a diagram illustrating an operation subsequent to FIG. 13.

Referring to FIG. 14, the refueling nozzle FN further enters the fuel passage 11P and causes the fuel to be supplied from the refueling nozzle FN into the tank-side passage 11Pb. The fuel supply beyond the full level of the fuel tank raises the fuel in the tank-side passage 11Pb. When the fuel enters a detection hole (not shown) formed in the vicinity of the edge of the fuel nozzle FN, an auto stop function of the refueling nozzle FN works to stop any further fuel supply.

(3)-2. Closing Operation

The closing operation of the open-close device 10 for fuel tank proceeds in the reverse order to the opening operation described above. More specifically, when the refueling nozzle FN pulls out of the filler port 30a on completion of the fuel supply, the open-close member 51 is rotated in the closing direction by the restoring force of the spring 59, along with upward move of the shaft members 55 in the shaft support holes 56c as shown in FIG. 11. When outer peripheries 55c of the shaft supports 55a of the shaft members 55 come into contact with the lower ends of the restricting elements 58a, the upward move of the shaft members 55 is restricted. In this state, when the open-close member 51 is rotated by the restoring force of the spring 59 and makes the restricted elements 58b approach the restricting elements 58a, the shaft members 55 move upward such that the restricting elements 58a move along the outer peripheries 55c in the substantially circular shape and enter the restricted elements 58b. At this moment, the flange 53a of the open-close member 51 compresses the gasket GS. In the state that the restricting elements 58a completely enter the restricted elements 58b, the open-close member 51 closes the filler port 30a. Subsequently, as shown in FIG. 12, when the refueling nozzle FN is pulled out, the shutter member 41 of the shutter mechanism 40 is rotated by the restoring force of the spring 48 on the bearing 45 to close the insertion opening 23a. The fuel lid FL (FIG. 1) is then closed.

(4) Functions and Advantageous Effects of Open-close Device 10 for Fuel Tank

The open-close device 10 for fuel tank according to the embodiment described above has the following functions and advantageous effects.

(4)-1. As shown in FIGS. 7, 10 and 11, in the process that the open-close member 51 opens the filler port 30a, the shaft support mechanism 54 guides the shaft bodies 55b of the open-close member 51 in the slots of the shaft support holes 56c from the first position P1 to the second position P2 and rotates the open-close member 51 about the shaft bodies 55b at the second position P2. More specifically, at the first position P1, in the rotation restricting mechanism 58, the restricting elements 58a are engaged with the restricted elements 58b to restrict the rotation of the open-close member 51. The open-close member 51 then moves in the direction away from the gasket GS, while maintaining its attitude parallel to the plane where the gasket GS is placed. In the process that the open-close member 51 closes the filler port 30a, on the contrary, at the second position P2, in the rotation restricting mechanism 58, the restricting elements 58a are not engaged with the restricted elements 58b, so as to allow the open-close member 51 to rotate about the shaft bodies 55b. On completion of this rotating operation, the open-close member 51 shifts to the first position P1, at which the open-close member 51 is moved in the direction of compressing the gasket GS, while maintaining its attitude parallel to the plane where the gasket GS is placed.

Accordingly, in the process that the open-close member 51 opens and closes the filler port 30a, at the first position P1 where the open-close member 51 warps the gasket GS, the open-close member 51 is moved in the direction of warping the gasket GS to uniformly warp the entire circumference of the gasket GS, while maintaining its attitude parallel to the plane on which the gasket GS is placed. This structure ensures the high sealing property.

(4)-2. Down-sizing of the flap valve mechanism 50 is attributed to the following reason. There is a difficulty in molding a small-diameter, thin gasket GS made of a rubber of high viscosity, since the rubber is unlikely to smoothly flow into a narrow cavity. The resulting gasket accordingly has a certain thickness. In the case of using a small-sized open-close member 51 with this gasket, the gasket GS is likely to receive a large force in the lateral direction during rotation of the open-close member 51 about a shaft. Especially, a specific part of the gasket close to the shaft members 55 of the open-close member 51 is likely to receive a large force in the lateral direction.

The open-close member 51 according to the embodiment, however, compresses the gasket GS without applying a force in the lateral direction, while maintaining its horizontal attitude relative to the gasket GS at the first position P1 where the open-close member 51 warps the gasket GS. The gasket GS may thus be designed to have a small diameter and to exert the highest sealing power when the gasket GS receives the force in a direction perpendicular to the plane flush with the gasket GS (warping direction) from the open-close member 51 to be bent. The gasket GS of such design produces a uniform warp along the entire circumference and ensures the high sealing property against the open-close member 51.

(4)-3. As shown in FIG. 9, the restricting element 58a of the rotation restricting mechanism 58 is formed to have the pointed tip. The restricted element 58b is, on the other hand, formed to have the wide opening and to be gradually tapered for engagement with the restricting element 58a. This allows for a smooth shift between the first position P1 and the second position P2.

(4)-4. As shown in FIGS. 4 to 6, the coupling mechanism 34 includes the first coupling part 34F and the second coupling part 34S and uses these two coupling parts to couple the valve support member 30 with the tubular body 12. The coupling position of the first coupling part 34F is inside the tubular body 12, while the coupling position of the second coupling part 34S is outside the tubular body 12. Accordingly, the coupling position of the first coupling part 34F inside the tubular body 12 is protected from an external force by the tubular body 12 as the barrier. Even when receiving a large external force caused by, for example, a collision of the vehicle, the valve support member 30 is unlikely to be uncoupled from the tubular body 12, so that the open-close device 10 for fuel tank ensures the high sealing property against the fuel tank.

(4)-5. The coupling position of the first coupling part 34F is hidden in the tubular body 12. It is accordingly difficult to check for secure engagement. The coupling position of the second coupling part 34S is outside the tubular body 12 and is visible from outside of the tubular body 12. The coupling state of the second coupling part 34S can thus be checked in the course of attachment of the valve support member 30 to the tubular body 12. The incomplete coupling state is thus avoidable.

(4)-6. After completion of coupling of the first coupling part 34F of the coupling mechanism 34, coupling of the second coupling part 34S is completed. There is accordingly only a need to check for the coupling state of the second coupling part 34S, since it is assumed that coupling of the first coupling part 34F has already been completed at this timing. This further facilitates the operation of attachment of the valve support member 30 to the tubular body 12.

(4)-7. In the coupling mechanism 34, in order to complete coupling of the second coupling part 34S after completion of coupling of the first coupling part 34F, the inner coupling structures 35 are configured to have a greater play at the engagement position than the outer coupling structures 36. In the case that the valve support member 30 receives an external force, the inner coupling structures 35 of the first coupling part 34F are elastically deformed after elastic deformation of the outer coupling structures 36 of the second coupling part 34S. The inner coupling structures 35 do not receive an abruptly increasing load and are thus unlikely to be disengaged from the first pipe-side engagement structures 15. Even when the open-close device 10 for fuel tank receives a large external force caused by, for example, a collision of the vehicle, the valve support member 30 is unlikely to be detached from the tubular body 12. This ensures the high sealing property against the fuel tank.

The invention is not limited to the above embodiment, but a diversity of variations and modifications may be made to the embodiment without departing from the scope of the invention. Some examples of possible modification are described below.

Figure 15:
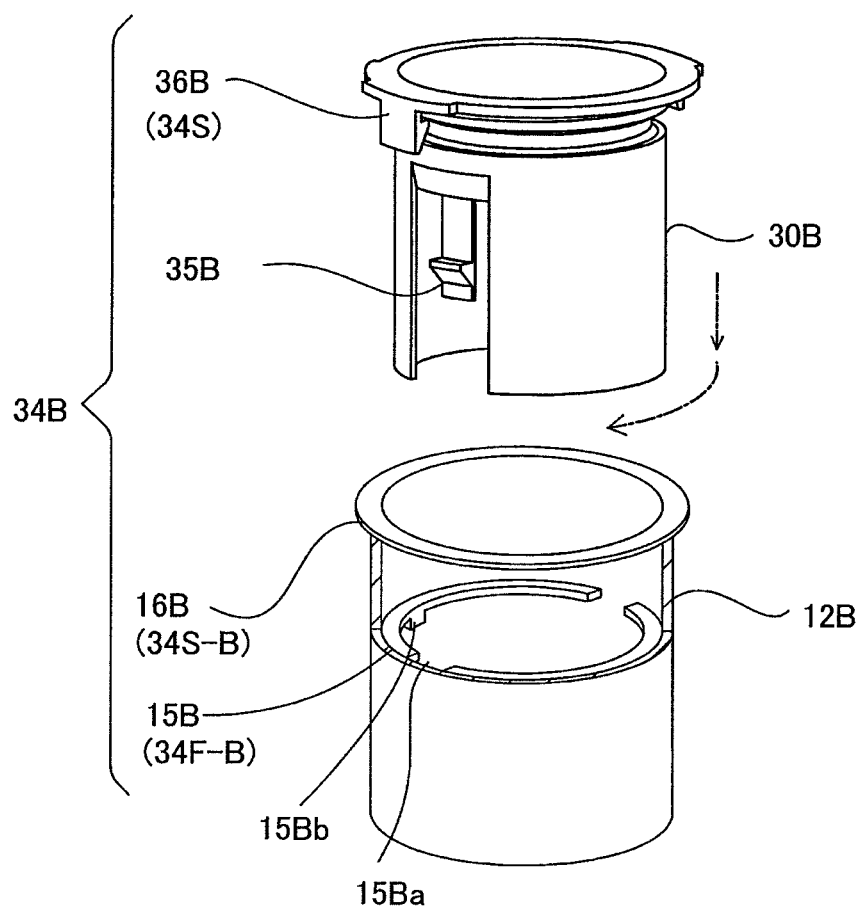
FIG. 15 is a diagram illustrating a state prior to assembly of a tubular body with a valve support member according to another embodiment.

FIG. 15 is a diagram illustrating a state prior to assembly of a tubular body with a valve support member according to another embodiment. This embodiment is characterized by the structure of a first coupling part 34F-B of a coupling mechanism 34B. More specifically, in the first coupling part 34F-B, a ring-shaped first pipe-side engagement structure 15B is protruded on the inner wall of a tubular body 12B, and cutouts 15Ba for insertion are formed in parts of the first pipe-side engagement structure 15B. Stoppers 15Bb are formed on a lower surface of the first pipe-side engagement structure 15B. For attachment of a valve support member 30B to the tubular body 12B, the process adjusts the positions of inner coupling structures 35B at the positions of the cutouts 15Ba and inserts the valve support member 30B in an axial direction into the tubular body 12B. This causes engagement of a second coupling part 34S-B first and thereby couples the valve support member 30B with the tubular body 12B. After that, when the valve support member 30B is rotated relative to the tubular body 12B, the inner coupling structures 35B of the first coupling part 34F-B come into contact with the stoppers 15Bb and stop. The valve support member 30B is accordingly attached to the tubular body 12B via engagement of the coupling mechanism 34B at the two different positions. As described in this embodiment, the coupling mechanism 34B may be structured to employ the rotating operation in addition to the operation of insertion in the axial direction, in order to attach the valve support member 30B to the tubular body 12B.

According to the above embodiment, as shown in FIG. 9, the rotation restricting mechanism 58 includes the restricting elements 58a formed as projections and the restricted elements 58b formed as cutouts. This is, however, not restrictive. Alternatively, the restricting elements may be formed as cutouts and the restricted elements may be formed as projections, so as not to restrict the rotation of the shaft members 55.

The above embodiment uses the pressing force of the spring 59 configured to open and close the open-close member 51 as the force of moving the shaft members 55 of the shaft support mechanism 54 in the shaft support holes 56c. This is, however, not restrictive, and another spring may be used for the same purpose.

The invention claimed is:

1. An open-close device for fuel tank configured to open and close a fuel passage for supplying a fuel discharged from a refueling nozzle to a fuel tank, the open-close device comprising:

a tubular body having a tube main body configured to form the fuel passage;

a valve support member having: a valve support main body in a cylindrical shape to be inserted into the tube main body; and a filler port configured to define part of the fuel passage; and a flap valve mechanism having: an open-close member pressed by an edge of the refueling nozzle to open the filler port; a shaft support mechanism provided on the open-close member and the valve support member to support the open-close member in a rotatable manner; a spring arranged to press the open-close member in a closing direction; and a gasket configured to seal between an opening periphery of the filler port and the open-close member, wherein the shaft support mechanism comprises: a shaft member formed on one end of the open-close member; a bearing member having a shaft support hole, in which the shaft member is supported in a rotatable manner relative to the valve support member; and a rotation restricting mechanism configured to restrict rotation of the shaft member supported in the shaft support hole, wherein the bearing member is configured to support the shaft member to be movable in the shaft support hole between a first position where the open-close member warps the gasket and a second position where the open-close member does not warp the gasket, and the rotation restricting mechanism comprises: a restricting element provided on the opening periphery of the filler port; and a restricted element provided on the shaft member to be engaged with the restricting element, wherein at the first position, the restricting element is engaged with the restricted element to restrict rotation of the shaft member, so that the open-close member is moved in a direction of warping the gasket, while maintaining an attitude substantially parallel to a plane where the gasket is placed, and at the second position, the restricting element is disengaged from the restricted element, so that the open-close member is rotatable about the shaft member.

2. The open-close device for fuel tank according to claim 1, wherein the shaft support hole is formed as a slot that allows the shaft member to move between the first position and the second position.

3. The open-close device for fuel tank according to claim 2, wherein the shaft member is pressed by the spring from the second position toward the first position.

4. The open-close device for fuel tank according to claim 3, wherein the restricting element is provided as a projection protruded from the opening periphery of the filler port, and the restricted element is provided as a cutout formed on an outer circumference of the shaft member to be engaged with the restricting element.

5. The open-close device for fuel tank according to claim 4, further comprising:

a coupling mechanism having a first coupling part and a second coupling part to couple the tubular body with the valve support member, wherein the first coupling part comprises: a first pipe-side engagement structure protruded from an inner wall of the tube main body toward center of the tube main body; and an inner coupling structure formed on outer wall of the valve support member to be engaged with the first pipe-side engagement structure, and the second coupling part comprises: a second pipe-side engagement structure protruded from an outer wall of the tube main body in a direction away from the center of the tube main body; and an outer coupling structure formed on an opening end of the valve support member to be engaged with the second pipe-side engagement structure, wherein the outer coupling structure is formed by folding along the opening end of the tube main body and the outer wall of the tube main body to he engaged with the second pipe-side engagement structure.

6. The open-close device for fuel tank according to claim 5, wherein the inner coupling structure comprises an engagement piece formed to be cantilevered and a claw provided on an end of the engagement piece, wherein the claw is configured to be engaged with the first pipe-side engagement structure, and the outer coupling structure comprises an engagement piece formed to be cantilevered and a claw provided on one end of the engagement piece, wherein the claw is configured to he engaged with the second pipe-side engagement structure.

7. The open-close device for fuel tank according to claim 6, wherein in a process of attachment of the tubular body to the valve support member by moving the tubular body in an axial direction of the tubular body, the second coupling part is configured such that coupling of the claw of the outer coupling structure with the second pipe-side engagement structure is completed after completion of coupling of the first coupling part.

8. The open-close device for fuel tank according to claim 2, wherein the restricting element is provided as a projection protruded from the opening periphery of the filler port, and the restricted element is provided as a cutout formed on an outer circumference of the shaft member to be engaged with the restricting element.

9. The open-close device for fuel tank according to claim 1, wherein the restricting element is provided as a projection protruded from the opening periphery of the filler port, and the restricted element is provided as a cutout formed on an outer circumference of the shaft member to be engaged with the restricting element.

10. The open-close device for fuel tank according to claim 1, further comprising:

a coupling mechanism having a first coupling part and a second coupling part to couple the tubular body with the valve support member, wherein the first coupling part comprises: a first pipe-side engagement structure protruded from an inner wall of the tube main body toward center of the tube main body; and an inner coupling structure formed on outer wall of the valve support member to be engaged with the first pipe-side engagement structure, and the second coupling part comprises: a second pipe-side engagement structure protruded from an outer wall of the tube main body in a direction away from the center of the tube main body; and an outer coupling structure formed on an opening end of the valve support member to be engaged with the second pipe-side engagement structure, wherein the outer coupling structure is formed by folding along the opening end of the tube main body and the outer wall of the tube main body to be engaged with the second pipe-side engagement structure.

11. The open-close device for fuel tank according to claim 10, wherein the inner coupling structure comprises an engagement piece formed to be cantilevered and a claw provided on an end of the engagement piece, wherein the claw is configured to be engaged with the first pipe-side engagement structure, and the outer coupling structure comprises an engagement piece formed to be cantilevered and a claw provided on one end of the engagement piece, wherein the claw is configured to be engaged with the second pipe-side engagement structure.

12. The open-close device for fuel tank according to claim 11, wherein in a process of attachment of the tubular body to the valve support member by moving the tubular body in an axial direction of the tubular body, the second coupling part is configured such that coupling of the claw of the outer coupling structure with the second pipe-side engagement structure is completed after completion of coupling of the first coupling part.

* * * * *